United States Patent [19]
Palmer

[11] Patent Number: 6,012,330
[45] Date of Patent: Jan. 11, 2000

[54] METHOD AND APPARATUS FOR THE ARTIFICIAL TRIGGERING OF LIGHTNING

[76] Inventor: Douglas A. Palmer, 1229 Trieste Dr., San Diego, Calif. 92107-3958

[21] Appl. No.: 09/087,481

[22] Filed: May 29, 1998

[51] Int. Cl.$^7$ ..................................................... G01W 1/00
[52] U.S. Cl. ........................................................ 73/170.24
[58] Field of Search ..................... 73/170.24; 361/117, 361/129, 130, 213; 702/4; 102/202.2, 202.3

[56] References Cited

U.S. PATENT DOCUMENTS

| | | | |
|---|---|---|---|
| 4,939,618 | 7/1990 | Fingerson et al. | 361/117 |
| 5,243,911 | 9/1993 | Dow et al. | 102/202.2 |
| 5,699,245 | 12/1997 | Herold | 702/4 |

OTHER PUBLICATIONS

Article from Scientific American by Jean–Claude Diels, et al., entitled, "Lightning Control with Lasers", Aug. 1997, pp. 50–55.

Jean–Claude Diels, et al., "Study of the Feasibility of Laser Induced Lightning: A Progress Report", Nov. 1997.

Article from Photonics Spectra entitled "CLEO/Pacific Rim InterOpto '97 Highlights", Aug. 1997.

Ad for L..E..C., Inc., in Dissipation Array Systems Copyright 1996 (No mo.).

Technical Specs. for "Thunderstorn Sensor (TSS) Model 924)" by Global Atmospherics, Inc. (No date).

Technical Specs. for "EFM, Electrical Field Mill" by Global Atmospherics, Inc. (No date).

*Primary Examiner*—William Oen
*Attorney, Agent, or Firm*—Baker & Maxham

[57] ABSTRACT

A method and apparatus is described whereby lightning within thunderheads and other cloud formations may be triggered in such a way as to minimize damage to surrounding structures and persons. The system consists of a high-pressure pump, accumulator, electrically actuated fast-valve and triggering system. In operation, through manual or automatic control, a high-pressure jet of water, which is rendered electrically conductive by traces of a solute such as salt or acid, is directed upward toward a threatening cloud. The high-conductivity swath of the water jet will act as a path for the discharge of lightning to the jet nozzle. In this method, lightning strikes may be diverted from sensitive areas to the apparatus.

18 Claims, 2 Drawing Sheets

METHOD AND APPARATUS FOR THE ARTIFICIAL TRIGGERING OF LIGHTNING

BACKGROUND OF THE INVENTION

1. Field of the Invention

This invention relates to systems for the protection of structures and persons from the damaging effects of lightning strikes that originate in clouds. Such lightning strikes include lightning that strikes the ground, or that strikes structures in electrical contact with the ground, or that strikes sensitive apparatus located near the ground.

2. Description of the Related Art

Lightning strikes cause enormous property damage around the world each year and take countless lives, estimated in the thousands. Approximately 44,000 thunderstorms develop on earth every day, generating on average approximately 100 strokes of lightning per second worldwide. Around 100 people in the U.S. are killed from lightning each year, and many more are injured. Lightning causes about 10,000 forest fires in the U.S. per year. It also causes 40% of all farm fires. A review of many years' worth of weather data shows that, in a typical year, lightning is the greatest source of weather damage in the United States, and lightning strike damage amounts to approximately 5% of all insurance claims. National U.S. statistics show that males in their teens and twenties are the most likely to be killed by lightning. Most lightning deaths occur in open fields, near or under trees, or around water. Eighty percent of fatalities occur between the hours of 10 AM and 7 PM. Fifty-two percent of fatalities occur on golf courses, playing fields, on tractors and the like, and 38% occur within a home or structure through contact with a bathtub, faucet, telephone, or appliance. The destruction of at least one jetliner, and one Atlas launch vehicle in March 1987, has been attributed to lightning.

A flash or stroke of lightning releases huge amounts of electrical energy in a very short period of time, less than one second. In particular, the duration of one stroke of lightning is about one fifth of a second. Voltages of the released energy may exceed 100,000,000 volts and peak current may exceed 300,000 amperes. Total energy released in a lightning strike can exceed 40 Gigajoules, enough electrical energy to light an entire city. Temperatures within the lightning stroke, which may range from the width of a pencil to as much as a foot across, can be as high as 50,000 degrees Celsius, five times hotter than the surface of the sun. Lightning flashes or strokes generally range from a hundred meters in length to over eight kilometers in length.

Study has shown that lightning is an effect caused by the stratification of charges within a thunderstorm, producing intense electric fields. Generally, in the case of lightning that strikes the ground (the most hazardous kind), the cloud bottom carries a negative charge. Positive charges may collect on the ground, on buildings, boat masts, people, flagpoles, mountaintops-or trees, in response to the electric fields above. Preceding a lightning flash, a stepped leader-a negative electrical charge made of zig-zagging segments, or steps-extends partway down from the cloud. The steps are invisible; each one is about 150 feet long. When the stepped leader gets within 150 feet of a collection of positive charges, a streamer (surge of positive electricity) rises from the charge collection to meet it. The leader and the streamer form a channel. An electrical current from an object on the ground surges upward through the channel, while negatively charged electrons travel in the opposite direction. This current flow creates a plasma in the atmosphere, generating a bright display called a return stroke. The return stroke is what people see and refer to as a lightning bolt, or flash, or stroke.

Many people feel safe from lightning because of the rarity of lightning in their geographic area, and therefore take no precautions. Nevertheless, even in areas considered to be far from lightning centers, damage can be extensive. A study by Lawrence Livermore National Laboratory, publication number FSIG-95-12-09-1, called "Lightning-Related Occurrences At DOE Facilities", was written in conjunction with development of a guidance document for lightning protection of Department of Energy (DOE) facilities. The study showed that the amount of lightning damage at a facility was not related to the number of regional thunder days reported by the local weather service. This indicates that the effectiveness of the lightning safeguards at a facility are more important than the annual number of thunderstorms in determining the likelihood that lightning caused damage will occur.

It is generally accepted that protecting humans and structures from lightning commenced in earnest with the invention of the lightning rod in 1752 by Benjamin Franklin. Since that time, methods of protection have grown more sophisticated, but have followed the same basic principle of conducting electrical charges around the object to be protected and/or dissipating them into the earth, where they will cause no harm. Protection in the latter half of the twentieth century has become more urgent, however. Some localized assets, such as nuclear power plants, electrical utility towers, rockets, stadia and sports complexes, telecommunications facilities, airports and aircraft, and the like, have extremely high value and are quite vulnerable. At the same time, widespread adoption of silicon transistor circuitry has rendered modern complex control systems more vulnerable to the electromagnetic disturbances caused by lightning.

A great deal of research has been conducted in protecting such high value assets. Some of the current research in the U.S. has been conducted by the National Aeronautics and Space Administration (NASA), for protecting spacecraft and launch facilities, and by the Electric Power Research Institute (EPRI), and in Japan by the Kansai Electric Power Company, for protecting power systems and equipment. The principle technique attempted is to form a conducting path from the ground to a point high in the atmosphere to induce a lightning strike. It is known that lightning is most likely to strike the highest object electrically connected to the ground. NASA conducted research on lightning for many years by firing small wire-trailing, solid-fueled rockets into the lower atmosphere, or by tethering balloons, to induce lightning strikes. Experiments have been conducted at the University of New Mexico, by Philips Labs. These experiments have produced improved prediction methods and better devices for the protection of equipment from lightning strikes.

The majority of currently available lightning protection systems take the form of variations of grounded lightning rods placed atop facilities requiring strike protection. The points of these rods take many forms, in an attempt to dissipate charge without inducing a lightning strike or by producing a conducting path that will induce a lightning strike to hit a protected tower or rod, rather than the facility. The points of such rods are typically manufactured in many fanciful forms, often having names like "Early Streamer Emission Air Terminals" or "Dissipating Arrays". Generally speaking, the effectiveness of these manifold forms is uncertain, at best.

The bulk of the lightning protection research has concentrated upon small refinements to the basic principle of the lightning rod, with refinements to protect equipment from voltage surges. For example, some methods are directed particularly at averting damage to the insulators on power transmission towers. Other efforts are directed to reducing the surge that accompanies a lightning discharge. Still other efforts relate to semi-conducting rods for preventing or diffusing a lightning stroke to mitigate the effects of the electrical surge. Other efforts are directed to preventing a return stroke by using a threshold coupling of a rod to ground.

Because of the huge damage threat to certain major facilities, systems for protecting moderately large sites are frequently sought. To protect larger areas, conducting paths must grow in height to the point that towers are not practical. Wires lofted by rockets, balloons, or kites have been utilized, but mostly for research purposes and not for practical deployment. Because of the cost and danger of using rockets or balloons to induce lightning strikes, recent research efforts have centered on using high-power lasers to create a long-distance plasma or ionization channel through the atmosphere and thereby induce a lightning strike. Research is being conducted at the University of New Mexico by researchers Bernstein, R., Diels, J. C., Stahlkopf, K. E. and Zhao, X. M. using paired UV and visible laser beams. Osaka University and the Kansai Electric Power Company have reported the successful triggering of lightning using a CO2 laser. In all of these methods, the resulting apparatus has been extremely bulky and expensive.

From the discussion above, it should be apparent that there is a need for a system and method for diverting lightning stokes away from valuable assets and harmlessly into the ground. The present invention satisfies this need.

SUMMARY OF THE INVENTION

In accordance with the present invention, a lightning stroke is triggered by a high-pressure jet of electrically conductive material that is trained generally vertically upward from the ground to create a conducting path through the atmosphere and into a cloud system to induce a lightning discharge or stroke. The conducting channel has a length of from several hundred feet to as much as several thousand feet into the air, achieved by directing the jet of conductive material upward from a protected enclosure to induce the collection of negative charges in the clouds to stream downward through the jet, into the enclosure, and harmlessly into the ground. By diverting the charges from a cloud system in a known path to a harmless conclusion, other structures or objects may be protected.

In one aspect of the invention, the conductive material can comprise, for example, water that is made electrically conductive by a solute of a mild acid or salt. In theory, a water jet will spray as high as the equivalent pressure for a given head of water (i.e., approximately one-half pound per square inch, per foot of head.) Windage, or friction from the atmosphere, will reduce that distance by a significant amount, causing the top of the jet to spread out. In a lightning trigger apparatus constructed in accordance with the present invention, the jet will be produced only for a time necessary to generate a plume to the desired altitude, and then will be halted. The actual volume of water that is consumed to produce the jet will equal the product of the area of the nozzle and the height of the fountain or plume. This volume could equal as little as several gallons. To produce a jet of conductive water 1000 feet high, for example, the theoretical water pressure could be as little as 500 psi, but because of windage effects, the water pressure may need to be ten times as great, or to 5000 psi. Pumps and systems for producing high-pressure water jets are commercially available because of their use in cutting tools for mining and excavation. Pressures in such systems range upward of 60,000 psi and are sufficient for purposes of this invention.

The water used in the jet can be derived from municipal tap-water systems, with supplementation from a storage unit of a solute designed for the purpose of increasing the electrical conductivity of the water. Common table salt or a simple acid such as acetic acid or citric acid also can be used for this purpose. The small amount of solute combined with the low water volume will result in minimal or no environmental damage. The water jet system can be located in a fixed structure or can be placed in a mobile platform, such as a wheeled vehicle.

Other features and advantages of the present invention should be apparent from the following description of the preferred embodiment, which illustrates, by way of example, the principles of the invention.

DESCRIPTION OF THE PREFERRED EMBODIMENTS

Figure 1:
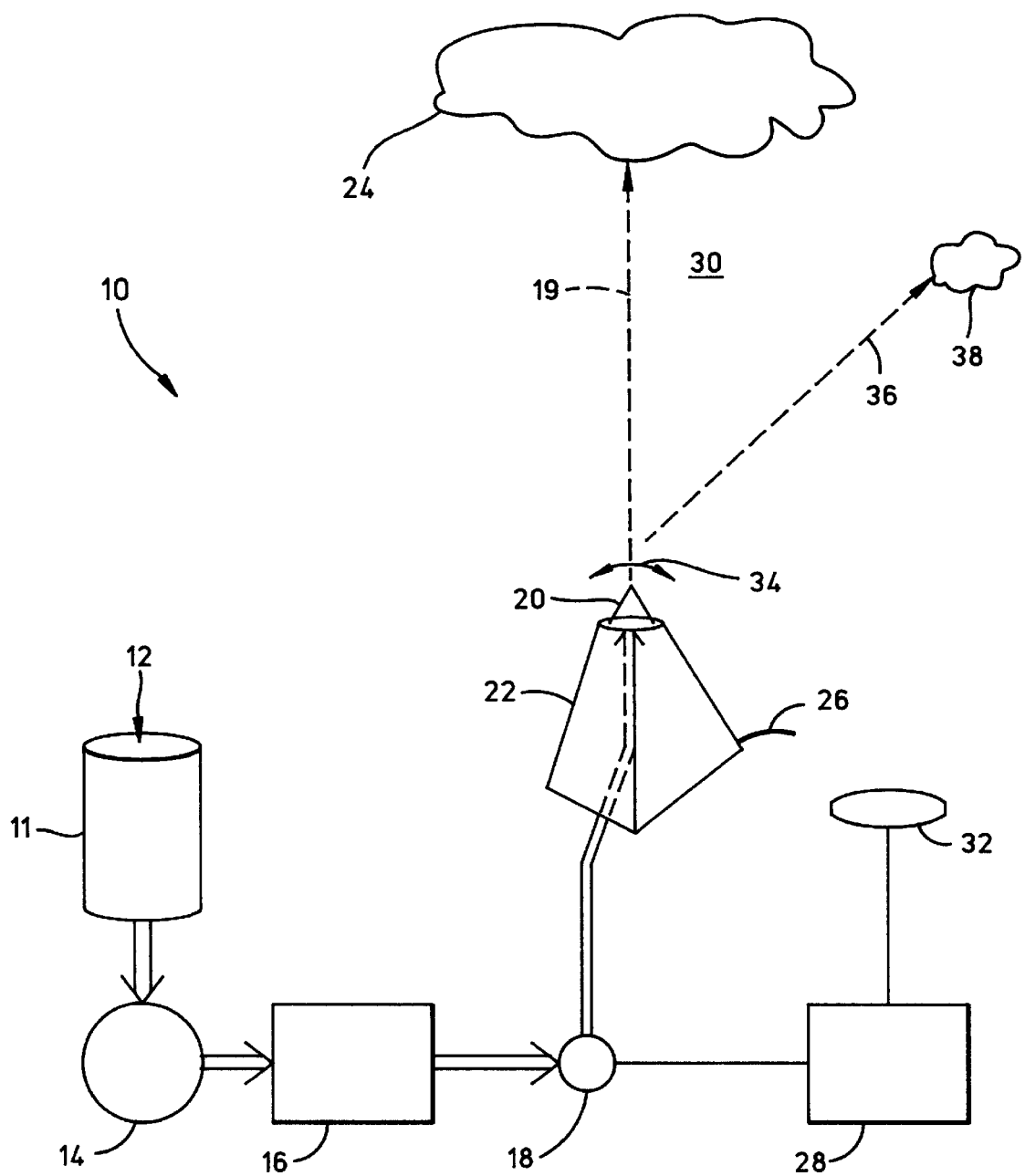
FIG. 1 is a schematic representation of a lightning triggering apparatus constructed in accordance with the present invention.

FIG. 1 shows the basic functional arrangement of a lightning trigger apparatus 10 constructed in accordance with the present invention. A storage tank 11 containing a solution 12 of water with a solute such as acetic acid, citric acid or a salt. Flow of solution is indicated in FIG. 1 by double lines, and flow of control signals and/or electrical power is indicated in FIG. 1 by single lines. The storage tank 11 feeds the solution 12 to a high-pressure pump 14 that pressurizes an accumulator 16. From the accumulator, a fast valve 18 opens to release a jet 19 of solution (indicated by the dashed line) through a discharge nozzle 20 located in an enclosure 22. The nozzle 20 directs the jet of water into a cloud system 24, thereby inducing a lightning strike that can be diverted to ground by a ground connection 26 located conveniently, if desired, at the enclosure 22. In this way, the system provides a conductive channel for lightning strokes to harmlessly travel to ground without damaging valuable assets or injuring people.

In the preferred embodiment, the accumulator 16 has an internal reservoir of pressurized air over the solution 12 contained within to provide elasticity to the high-pressure jet 19 that is produced. More particularly, as the pressure in the accumulator falls, the solution is ejected at a lower pressure, which suits the diminishing height requirement of the water jet. The fast valve 18 is an electrically actuated valve that is operated by an electronic controller 28. The fast valve 18 snaps open to release a jet of solution through the discharge nozzle 20 to the atmosphere 30 and into the cloud system 24. The metallic enclosure 22 is securely grounded 26 to conduct the charges from the lightning stroke to ground in a safe manner, and is thereby protected. The controller 28 can be provided with information from an electric field sensor 32, or other sensor, that provides an indication when there is a possibility of thunderstorm activity with risk of lightning activity in the area.

In the preferred embodiment, the nozzle 20 is adjustable so that it can be moved about in an angle, as indicated by the arrows 34 in FIG. 1. This permits some aiming of the solution jet to various angles from vertical, as illustrated by the alternative solution jet 36 pointed at a different cloud system 38. In this way, the jet can be directed to particular areas that information from the field sensor 32 indicates is the greatest threat.

In one aspect of the invention, the conducting ground connection can comprise an energy collection system (such as a capacitive system) that collects the energy released by a lightning stroke and then releases it in a controlled fashion. The released energy then can be used, for example, to provide power to the field sensors 32, the controller 28, or the valve 18.

Figure 2:
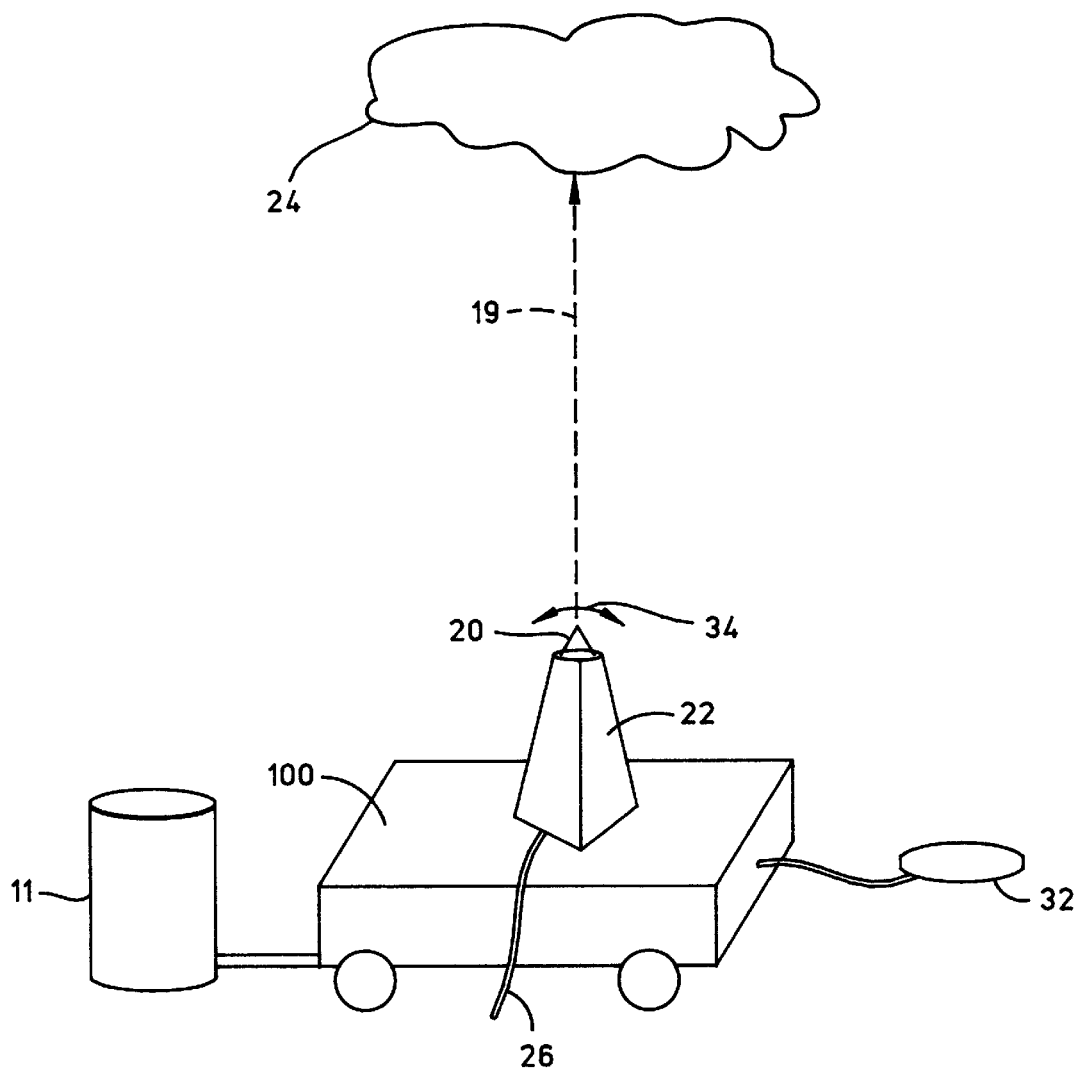
FIG. 2 is a schematic representation of a mobile lightning triggering apparatus constructed in accordance with the present invention.

FIG. 2 shows an alternative embodiment of the present invention as implemented in a mobile platform, such as a wheeled vehicle 100. In FIG. 2, the vehicle is coupled to the storage tank 11, but it should be understood that the solution tank can be mounted on the vehicle 100, if desired. It should further be understood that the portions of the first embodiment shown in FIG. 1 that are not visible are actually contained within the vehicle 100. Thus, a pump 14, accumulator 16, valve 18, and controller 28 are contained within the vehicle. Any one of these components can be displaced and moved outside the vehicle, if desired. As with the other embodiment, the nozzle 20 can be directed to angles other than vertical, for better positioning of the jet 19.

The present invention has been described above in terms of a presently preferred embodiment so that an understanding of the present invention can be conveyed. There are, however, many configurations for the artificial triggering of lightning not specifically described herein but with which the present invention is applicable. Other embodiments and modifications of the invention will occur readily to those of ordinary skill in the art, in view of the teachings described above. The present invention should therefore not be seen as limited to the particular embodiment described herein, but rather, it should be understood that the present invention has wide applicability with respect to the artificial triggering of lightning generally. All modifications, variations, or equivalent arrangements and implementations that are within the scope of the attached claims should therefore be considered within the scope of the invention.

I claim:

1. A system for the triggering of lightning from clouds, the system comprising:

a source of electrically conductive material;

jet means for producing a high-pressure jet of the electrically conductive material; and nozzle means for directing the high-pressure jet of electrically conductive material into a charge collection within a cloud system and providing a conduction channel from the cloud system to the ground, through which a lightning stroke is conducted.

2. A system as defined in claim 1, wherein the electrically conductive material comprises water or other solvent containing a chemical solute of acid or salt that renders the solution electrically conductive.

3. A system as defined in claim 1, wherein the jet means comprises a high-pressure discharge pumping system that is placed in a mobile installation.

4. A system as defined in claim 1, wherein the jet means comprises a high-pressure discharge pumping system that is located in a fixed installation.

5. A system as defined in claim 1, wherein the-nozzle means permits a vertical discharge of the electrically conductive material.

6. A system as defined in claim 1, wherein the nozzle means permits a discharge of the electrically conductive material at variable angles relative to the ground.

7. A system as defined in claim 1, further including discharge means for directing the lightning stroke into a predetermined location away from structures and persons.

8. A system as defined in claim 7, wherein the discharge means directs the lightning stroke into an energy collection system.

9. A system as defined in claim 8, wherein the system is connected to the energy collection system so as to derive operating energy from the energy collection system.

10. A method of triggering lightning from clouds, the method comprising the steps of:

providing a source of electrically conductive material;

producing a high-pressure jet of the electrically conductive material; and directing the high-pressure jet of electrically conductive material into a charge collection within a cloud system; and providing a conduction channel from the cloud system to the ground, through which a lightning stroke is conducted.

11. A method as defined in claim 10, wherein the electrically conductive material comprises water or other solvent containing a chemical solute of acid or salt that renders the solution electrically conductive.

12. A method as defined in claim 10, wherein the high-pressure jet is produced from a high-pressure discharge pumping system that is placed in a mobile installation.

13. A method as defined in claim 10, wherein the high-pressure jet is produced from a high-pressure discharge pumping system that is located in a fixed installation.

14. A method as defined in claim 10, wherein the step of directing comprises directing the discharge of the electrically conductive material in a vertical discharge.

15. A method as defined in claim 10, wherein the step of directing comprises directing the discharge of the electrically conductive material at variable angles relative to the ground.

16. A method as defined in claim 10, further including the step of directing the lightning stroke into a predetermined location away from structures and persons.

17. A method as defined in claim 16, wherein the lightning stroke is directed into an energy collection system.

18. A method as defined in claim 17, further including the step of deriving operating energy for the step of producing from the energy collection system.

* * * * *